(12) United States Patent
Gohshi (10) Patent No.: US 9,471,962 B2
(45) Date of Patent: Oct. 18, 2016

(54) IMAGE ENHANCEMENT APPARATUS AND IMAGE ENHANCEMENT METHOD

(71) Applicant: KEISOKU GIKEN CO., LTD., Yokohama-shi, Kanagawa (JP)

(72) Inventor: Seiichi Gohshi, Tokyo (JP)

(73) Assignee: KEISOKU GIKEN CO., LTD., Yokohama (JP)

( * ) Notice: Subject to any disclaimer, the term of this patent is extended or adjusted under 35 U.S.C. 154(b) by 85 days.

(21) Appl. No.: 14/404,558

(22) PCT Filed: Aug. 7, 2013

(86) PCT No.: PCT/JP2013/071899
§ 371 (c)(1),
(2) Date: Dec. 2, 2014

(87) PCT Pub. No.: WO2014/025067
PCT Pub. Date: Feb. 13, 2014

(65) Prior Publication Data
US 2015/0146995 A1 May 28, 2015

(30) Foreign Application Priority Data
Aug. 9, 2012 (JP) ................. 2012-177476

(51) Int. Cl.
*G06K 9/40* (2006.01)
*G06T 5/00* (2006.01)
(Continued)

(52) U.S. Cl.
CPC ............... *G06T 5/00* (2013.01); *G06T 5/003* (2013.01); *G06T 5/20* (2013.01); *H04N 1/4092* (2013.01); *H04N 5/208* (2013.01); *G06T 2207/20192* (2013.01)

(58) Field of Classification Search
CPC .... H04N 1/4092; H04N 5/142; H04N 5/208; H04N 5/217; H04N 5/2254; H04N 5/335; H04N 5/357; H04N 5/365; H04N 19/126; H04N 19/14; H04N 19/149; H04N 19/15; H04N 19/152; H04N 19/159; H04N 19/169; H04N 19/176; H04N 19/177; H04N 19/192; H04N 19/42; H04N 19/423; H04N 19/44; H04N 19/61; H04N 19/86; G06T 5/002; G06T 5/003; G06T 5/004; G06T 5/007; G06T 5/10; G06T 5/20; G06T 5/50; G06T 2207/10016; G06T 2207/20012; G06T 2207/20148; G06T 2207/20192; G06T 2207/20201; G06K 9/36; G02B 27/46
See application file for complete search history.

(56) References Cited

U.S. PATENT DOCUMENTS 7,911,501 B2 * 3/2011 Johnson ................ G02B 27/46
348/222.1
2011/0279730 A1 11/2011 Goshi
(Continued)

FOREIGN PATENT DOCUMENTS

JP H05-075313 B2 5/1993
JP 08-139969 * 5/1996 ............. H04N 5/208
(Continued)

OTHER PUBLICATIONS
Nov. 12, 2013 International Search Report issued in International Patent Application No. PCT/JP2013/071899.
(Continued)

*Primary Examiner* — Jose Couso
(74) *Attorney, Agent, or Firm* — Oliff PLC (57) ABSTRACT

An image enhancement apparatus according to the present invention for generating an output image obtained by sharpening an input image includes a non-linear processing unit configured to carry out non-linear processing on an input image signal representing the input image, a filter unit configured to generate a second signal by removing at least a DC component of the frequency components included in the first signal, a limiter configured to generate a third signal by adjusting the second signal, and an adder configured to generate an output image signal representing the output image by adding the third signal to the input image signal.

6 Claims, 10 Drawing Sheets

(51) Int. Cl.
*G06T 5/20* (2006.01)
*H04N 5/208* (2006.01)
*H04N 1/409* (2006.01)

(56) References Cited

U.S. PATENT DOCUMENTS

| | | |
|---|---|---|
| 2012/0070098 A1 | 3/2012 | Gohshi |
| 2012/0213289 A1 | 8/2012 | Gohshi |
| 2012/0314968 A1 | 12/2012 | Gohshi |
| 2012/0314969 A1 | 12/2012 | Furukawa et al. |
| 2013/0176495 A1 | 7/2013 | Gohshi |

FOREIGN PATENT DOCUMENTS

| | | |
|---|---|---|
| WO | 2010/113342 A1 | 10/2010 |
| WO | 2010/140281 A1 | 12/2010 |
| WO | 2011/061958 A1 | 5/2011 |
| WO | 2011/099202 A1 | 8/2011 |
| WO | 2011/105377 A1 | 9/2011 |
| WO | 2012/043407 A1 | 4/2012 |

OTHER PUBLICATIONS

Translation of Jan. 17, 2013 Office Action issued in Japanese Patent Application No. 2012-177476.
Translation of May 21, 2013 Office Action issued in Japanese Patent Application No. 2012-177476.
Farisu Sina, et al., "Fast and Robust Multiframe Super Resolution," IEEE Transactions on Image Processing, pp. 1327-1344, vol. 13, No. 10, Oct. 2004.
Mar. 2, 2016 Search Report issued in European Patent Application No. 13827925.2.

* cited by examiner

(A)
Before gamma processing (B)
After gamma processing

FIG. 7

(A) Original image (B) Proposed method

FIG. 8

(A)
Spectrum of original image (B)
Spectrum of proposed method

FIG. 9

(A) Conventional method

(B) Proposed method

IMAGE ENHANCEMENT APPARATUS AND IMAGE ENHANCEMENT METHOD

CROSS REFERENCE TO RELATED APPLICATION

This application claims priority to and the benefit of Japanese Patent Application No. 2012-177476 (filed on Aug. 9, 2012), the entire contents of which are incorporated herein by reference.

TECHNICAL FIELD

The present invention relates to an image enhancement apparatus and an image enhancement method for improving image quality by sharpening an image and, in particular, to an image enhancement apparatus and an image enhancement method that are suitable for sharpening, for example, a video displayed in real time on a television (TV) receiver.

BACKGROUND ART

Figure 10:
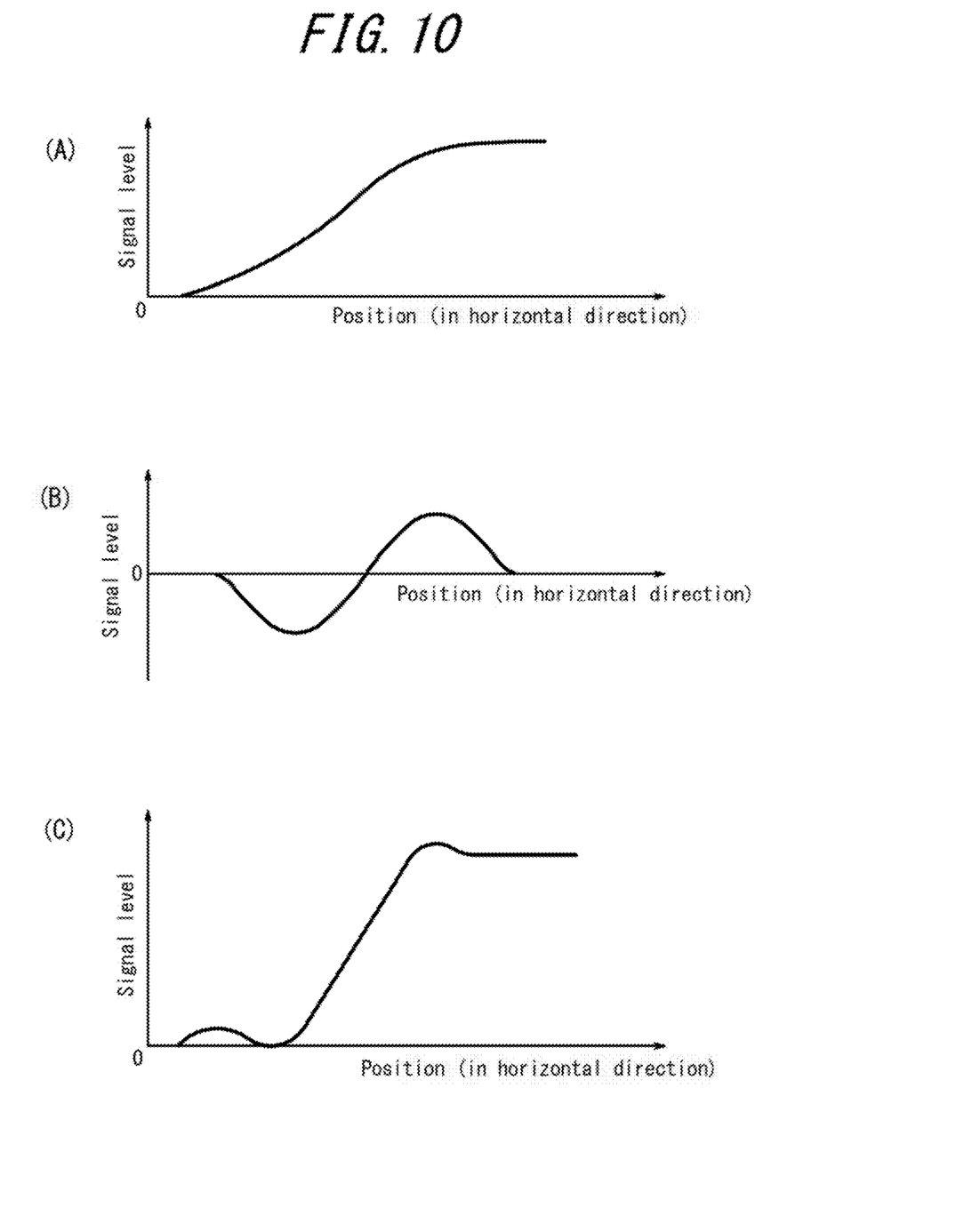
FIGS. 10(A) to 10(C) are diagrams illustrating changes in the horizontal direction waveform of the signal level of the image subjected to conventional image enhancement processing.

Image enhancement processing for improving the image quality by sharpening an image has been widely known conventionally. For example, a conventional television receiver carries out outline compensation for sharp-rising and sharp-falling of a video signal corresponding to an outline portion of an image to be displayed. This contour compensation extracts a high frequency component of an input image signal (a luminance signal), amplifies the high frequency component, and then adds the amplified high frequency component to the input image signal, thereby improving visual quality. FIGS. 10(A)-10(C) are diagrams illustrating changes in a waveform of the signal level of the image caused by the conventional image enhancement processing. FIG. 10(A) is a diagram illustrating a horizontal direction waveform of a signal level of the input image signal particularly illustrating a waveform of a portion corresponding to an edge where the signal level changes in the horizontal direction. FIG. 10(B) illustrates the high frequency component extracted from the input image signal. By amplifying the high frequency component and adding the amplified high frequency component to the input image signal, an output image signal having a sharp rising edge as illustrated in FIG. 10(C) may be obtained.

In recent years, also, there has also been suggested a technique called super-resolution that particularly up-converts the input image into an output image of higher resolution and carries out the image enhancement processing on an image obtained by the up-conversion (for example, see Non-Patent Document 1).

RELATED ART DOCUMENT

Non-Patent Document

Non-Patent Document 1: S. Farsiu, D. Robinson, M. Elad, and P. Milanfar, "Fast and Robust Multi-frame Super-resolution", IEEE Transactions on Image Processing, vol. 13, no. 10, pp. 1327-1344, October 2004.

SUMMARY OF INVENTION

Technical Problem

The conventional image enhancement processing is based on linear digital signal processing and thus is unable to generate a frequency component higher than Nyquist frequency, i.e., a frequency component higher than ½ of a sampling frequency of a target image. Therefore, for an improvement in the image quality, the conventional image enhancement processing cannot generate and utilize the frequency component exceeding the Nyquist frequency in order to sharpen the image.

For example, when a full high-definition television (HDTV: High Definition Television, 1080×1920 pixels) receiver enlarges and displays an image signal with resolution under the resolution for the HDTV, the image is displayed blurry. Similarly, when the image signal with resolution for the HDTV is enlarged to an image with higher definition (for example, 4K resolution of approximately 4000×2000 pixels), the image is displayed blurry. A reason for the image to be displayed blurry is because the image signal subjected to the enlargement processing includes frequency components up to the Nyquist frequency of an original image before subjected to the enlargement processing and does not include frequency components near the Nyquist frequency of the image subjected to the enlargement processing.

Figure 11:
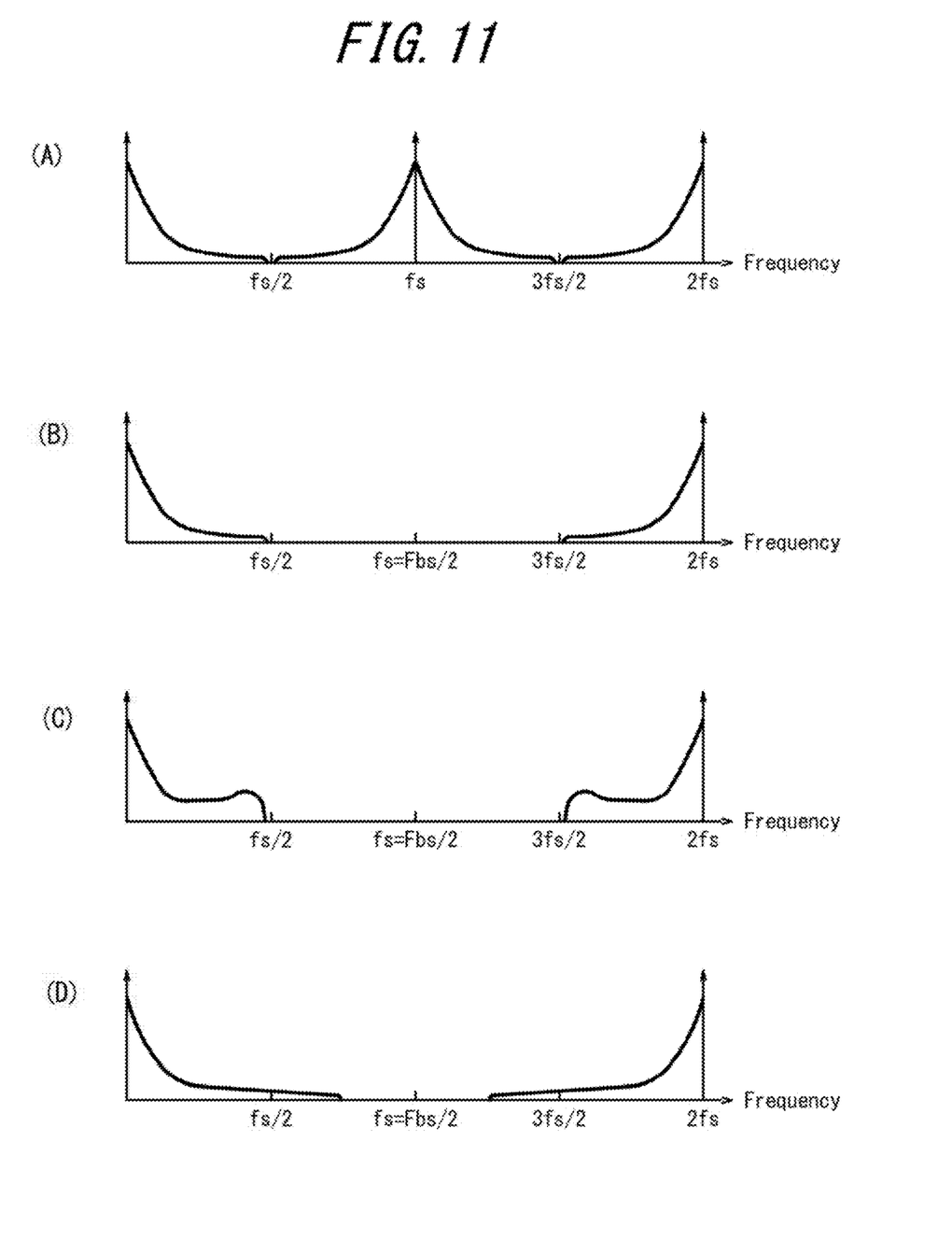
FIGS. 11(A) to 11(D) are diagrams illustrating changes in frequency components caused by image enlargement processing and the image enhancement processing.

Hereinafter, changes in the frequency component according to the image enlargement processing and the image enhancement processing will be described with reference to FIGS. 11(A)-11(D). FIG. 11(A) illustrates a frequency spectrum of a digital image signal with a sampling frequency fs, and FIG. 11(B) illustrates a frequency spectrum when the digital image signal is up-converted and the number of pixels is doubled in the horizontal direction. A sampling frequency Fbs subjected to the enlargement processing is twice the frequency of the original sampling frequency fs (Fbs=2fs). Here, as illustrated in FIG. 11(B), in the digital image signal after the up-conversion, there is no frequency components between the Nyquist frequency fs/2 corresponding to the original sampling frequency fs and a new Nyquist frequency Fbs/2=fs corresponding to the new sampling frequency Fbs.

FIG. 11(C) illustrates a frequency spectrum when the digital image signal subjected to the up-conversion is subjected to the image enhancement processing by the conventional linear digital signal processing. As illustrated in the figure, the image enhancement processing employing the linear digital signal processing increases the number of frequency components near the original Nyquist frequency fs/2. However, the image enhancement processing employing the conventional linear digital signal processing does not generate frequency components exceeding the original Nyquist frequency fs/2. Therefore, the image enhancement processing employing the conventional linear digital signal processing, as illustrated in FIG. 11(D), for example, does not generate frequency components that exceed the original Nyquist frequency fs/2 and are near the new Nyquist frequency Fbs/2. That is, to the digital image signal subjected to the up-conversion, for the improvement in the image quality, image sharpening by generating and utilizing frequency components exceeding the Nyquist frequency could not be substantialized.

Further, conventional super-resolution techniques such as one described in Non-Patent Document 1 employs the image enhancement processing for carrying out repeating arithmetic processing on a plurality of frames with the same sampling frequency and selecting and synthesizing high resolution pixels from each frame. Therefore, there have been problems that some images may not be properly restored, possibly causing flicker in a video in which a collapsed image is suddenly appeared and also that an amount of the arithmetic processing in using a plurality of frames is very large.

Accordingly, the present invention aims to provide an image enhancement apparatus and an image enhancement method that are capable of, without repeating arithmetic processing on a plurality of frames, sharpening an image by using the frequency components exceeding the Nyquist frequency.

Solution to Problem

In order to solve the above problems, an image enhancement apparatus according to the present invention for generating an output image obtained by sharpening an input image, the image enhancement apparatus includes: a non-linear processing unit configured to generate a first signal by carrying out non-linear processing on an input image signal representing the input image, the first signal being expressed as a continuous non-linear function with respect to the input image signal, and configured to generate frequency components that are not included in the input image signal; a filter unit configured to generate a second signal by removing at least a DC component of the frequency components included in the first signal; a limiter configured to generate a third signal by adjusting the second signal; and an adder configured to generate an output image signal representing the output image by adding the third signal to the input image signal.

Preferably, the non-linear processing unit generates a power of the input image signal as the first signal.

Preferably, the non-linear processing unit generates a power root of the input image signal as the first signal.

Although the apparatus is employed as the solution of the present invention as described above, a method, a program, and a storage medium storing the program that substantially correspond to the above apparatus and are executed by a processor of the apparatus may also substantialize the present invention and thus are included in the scope of the present invention.

For example, an image enhancement method substantializing the present invention as a method is an image enhancement method employed by an image enhancement apparatus for generating an output image obtained by sharpening an input image, the image enhancement method includes: a non-linear processing step of generating a first signal by carrying out non-linear processing on an input image signal representing the input image, the first signal being expressed as a continuous non-linear function with respect to the input image signal, and generating frequency components that are not included in the input image signal; a step of generating a second signal by removing at least a DC component of the frequency components included in the first signal; a step of generating a third signal by adjusting the second signal; and a step of generating an output image signal representing the output image by adding the third signal to the input image signal.

Preferably, the non-linear processing step generates a power of the input image signal as the first signal.

Preferably, the non-linear processing step generates a power root of the input image signal as the first signal.

Effect of the Invention

According to the image enhancement apparatus and the image enhancement method of the present invention, without repeating arithmetic processing on a plurality of frames, an image may be sharpened by using frequency components exceeding Nyquist frequency.

DESCRIPTION OF EMBODIMENT

Hereinafter, an embodiment of the present invention will be described in detail with reference to the accompanying drawings.

Figure 1:
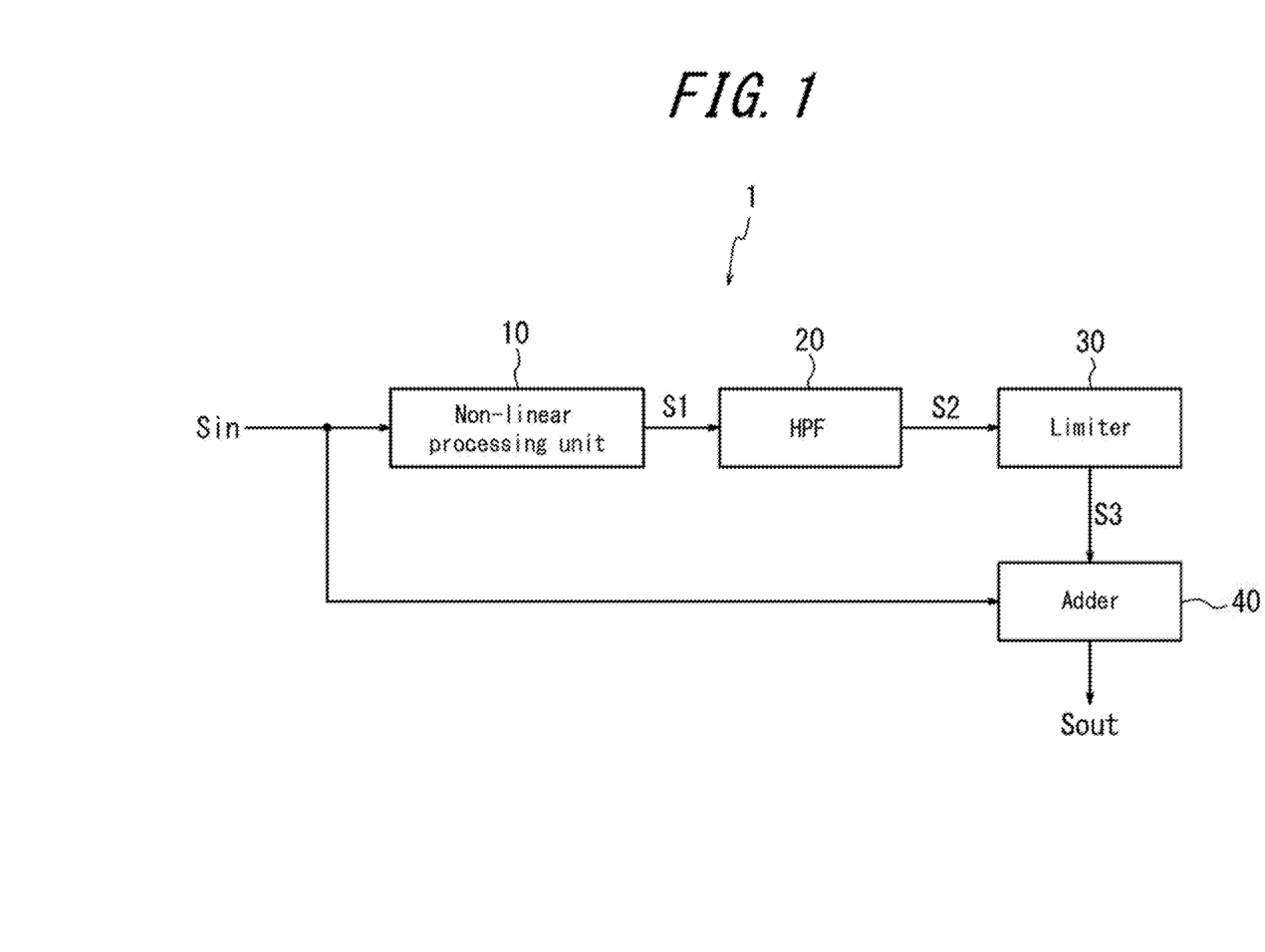
FIG. 1 is a diagram illustrating a configuration of an image enhancement apparatus according to one embodiment of the present invention.

FIG. 1 is a block diagram illustrating a configuration of an image enhancement apparatus 1 according to one embodiment of the present invention. The image enhancement apparatus 1 carries out, on an input image signal $S_{in}$ externally input as a digital signal representing an image, processing for sharpening the image represented by the input image signal $S_{in}$ (hereinafter, referred to as "image enhancement processing" or simply as "enhancement processing"). The image enhancement apparatus 1 includes a non-linear processing unit 10, a high-pass filter (HPF) 20, a limiter 30, and an adder 40.

The image represented by the input image signal $S_{in}$ may be either a still image or a video. When the input image signal $S_{in}$ represents the video, the video may be displayed in real time by, for example, a standard definition television (SDTV: Standard Definition Television) receiver or a high-definition television (HDTV: High Definition Television) receiver.

Figure 2:
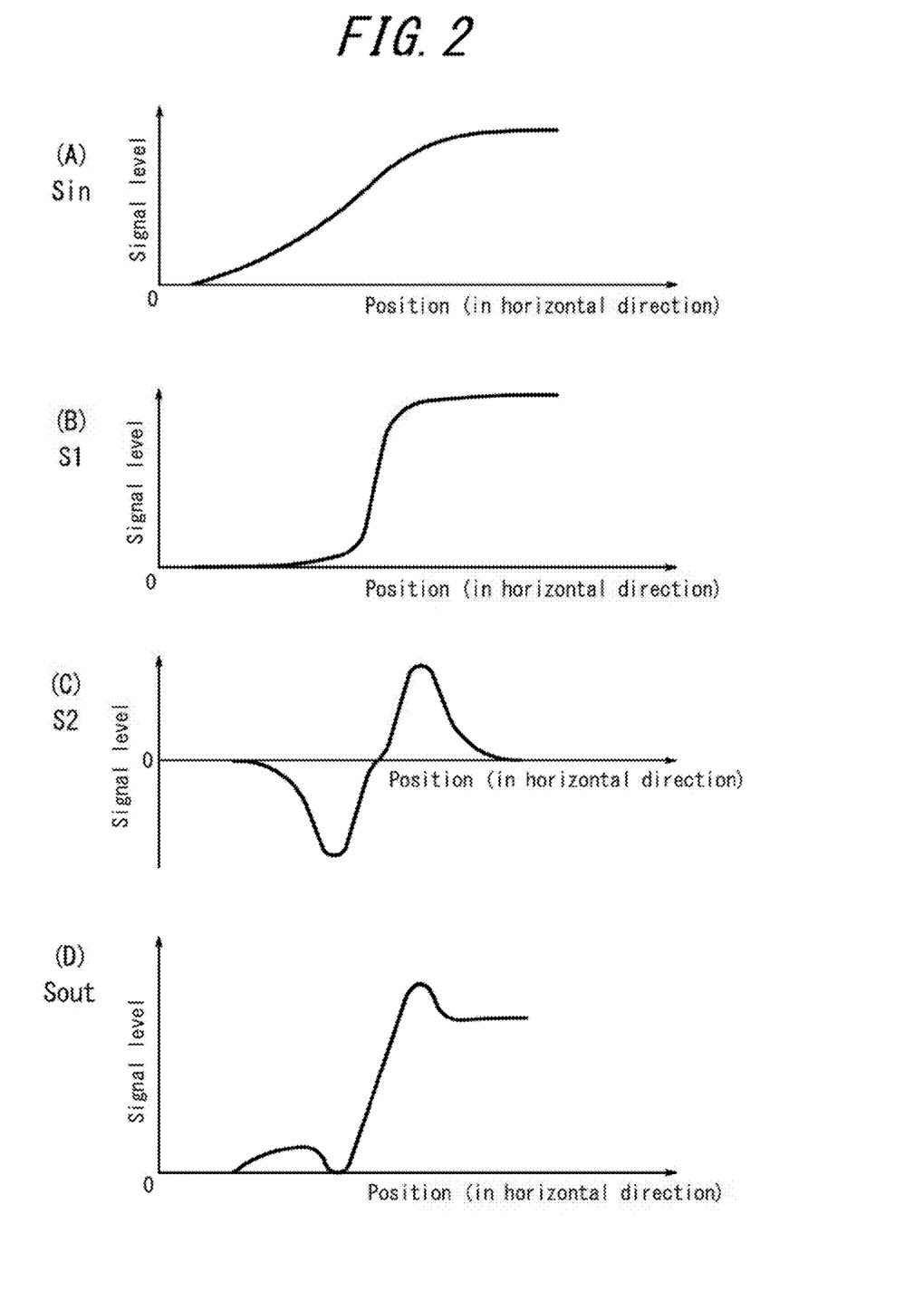
FIGS. 2(A) to 2(D) are diagrams illustrating horizontal direction waveforms of a signal level of an image.

Now, by using a horizontal direction waveform of a signal level (a luminance value) of the image as illustrated in FIG. 2(A) by way of example, operations carried out by each unit and an output waveform will be described. Note that, although each unit will be described below in association with the horizontal direction waveform of the image, each unit may carry out, also for a vertical direction waveform of the signal level of the image and a time direction waveform of the signal level between images of the video, the image enhancement processing employing processing similar to that for the horizontal direction waveform.

FIG. 2(A) is a diagram illustrating the horizontal direction waveform of the signal level of the input image signal $S_{in}$, particularly illustrating a portion corresponding to an edge where the signal level changes in the horizontal direction. Note that resolution of the input image signal $S_{in}$ corresponds to that of an output image signal $S_{out}$ and, when the resolution of the output image is higher than that of an original input image, the input image signal $S_{in}$ is obtained by up-conversion of the resolution of the original input image into the resolution of the output image signal $S_{out}$. For example, when the image enhancement apparatus 1 outputs an image for the SDTV as an image for the HDTV, the input image signal S1 is obtained by carrying out existing linear conversion for converting the original image for the SDTV into the image with the resolution of the HDTV The non-linear processing unit 10 generates a first signal S1 by carrying out the non-linear processing on the input image signal $S_{in}$. The non-linear processing carried out by the non-linear processing unit 10 is used for the purpose of sharpening an outline of the image and, in particular, to generate the first signal S1 as illustrated in FIG. 2(B) from the input image signal $S_{in}$ as illustrated in FIG. 2(A) such that the signal level has sharp rising.

The processing to generate the first signal S1 from the input image signal $S_{in}$ carried out by the non-linear processing unit 10 may be generalized by Formula (1) shown below. The non-linear processing carried out by the non-linear processing unit 10 includes all exponential multipliers of a general rational number represented by p/q.

[Formula 1]

$$S1 = S_{in}^{\frac{p}{q}} \tag{1}$$

For example, the non-linear processing unit 10 generates the first signal S1 from the power of the input image signal $S_{in}$. When the non-linear processing unit 10 generates the first signal S1 from n-power of the input image signal $S_{in}$, $S1=S_{in}^n$ is satisfied. In particular, since the input image signal S1, is a digital signal (a discrete signal), when the input image signal $S_{in}$ is formed by a data sequence X1, X2, X3, . . . , the first signal S1 is a digital signal formed by a data sequence X1$^n$, X2$^n$, X3$^n$, . . . . Note that n is any real number.

For example, when the input image signal $S_{in}$ is an 8-bit digital signal, the signal level of each pixel takes a value of 0 to 255. At this time, when the non-linear processing unit 10 squares the input image signal $S_{in}$, an edge portion sharply rises as illustrated in FIG. 2(B) as an example, thus the outline of the image is enhanced.

Or, the non-linear processing unit 10 generates the first signal S1 from, for example, a power root of the input image signal $S_{in}$. When the non-linear processing unit 10 generates the first signal S1 from n-th root of the input image signal $S_{in}$, $S1=S_{in}^{1/n}$ is satisfied. In particular, since the input image signal $S_{in}$ is the digital signal (the discrete signal), when the input image signal $S_{in}$ is formed by the data sequence X1, X2, X3, . . . , the first signal S1 is a digital signal formed by a data sequence X1$^{1/n}$, X2$^{1/n}$, X3$^{1/n}$, . . . . Note that n is any real number.

The non-linear processing for generating the first signal S1 by taking the power root of the input image signal $S_{in}$ is suitable for contour extraction based on human perception characteristics. For example, Weber-Fechner law is known as a law based on human perception. Applying this law to image recognition, it may be considered that an outline in a region with low brightness may be perceived more easily than an outline in a high brightness region. Therefore, the non-linear processing unit 10 carries out the non-linear processing by employing, for example, a gamma correction function (for example, $S1=S_{in}^{1/2}$) so as to enhance a pixel with low brightness more as opposed to a pixel with high brightness.

In this case, the non-linear processing unit 10 uses Formula (2) to calculate the X', which is a normalized value of a pixel value X of an m-bit digital signal. The value of the X' subjected to the normalization by using Formula (2) is between 0 and 1.

[Formula 2]

$$X' = \frac{X}{2^m} \tag{2}$$

Here, the non-linear processing unit 10 applies a gamma correction function shown by Formula (3) to X' subjected to the normalization and calculates a value Y subjected to the non-linear processing.

[Formula 3]

$$Y = X'^{\frac{1}{n}} \tag{3}$$

With Formula (3), when the value of the X' is small, the value of Y after the non-linear processing is raised higher than the X'. That is, a pixel with low brightness is raised higher than a pixel with high brightness. Accordingly, edge sharpening illustrated in FIG. 2(B), for example, particularly increases an edge enhancement component of the region with low brightness, thereby further enhancing the outline of the image particularly in the region with low brightness.

The HPF 20 generates a second signal S2, which is a high-frequency signal, by removing at least a DC component of the frequency components included in the first signal S1. In particular, the HPF 20, in processing for the removal of the high frequency component including an outline component of the image obtained by the non-linear processing on the input image signal $S_{in}$, extracts the second signal S2 illustrated in FIG. 2(C) from the first signal S1 illustrated in FIG. 2(B). Here, comparing between the second signal S2 illustrated in FIG. 2(C) and a signal of a high frequency component obtained by conventional non-linear digital processing illustrated in FIG. 10(B), the second signal S2 has sharper waveform than the conventional high frequency component. As described later, the second signal S2 is added, as a compensation signal for image sharpening, to the input image signal $S_{in}$ via the limiter 30. That is, the second signal S2 having a sharper waveform than the conventional high frequency component allows for the image enhancement processing of higher definition as compared with conventional processing. Also, along with the sharpening of the outline, the occurrence of ringing, which has been an issue of the conventional linear digital processing, may be reduced.

Figure 3:
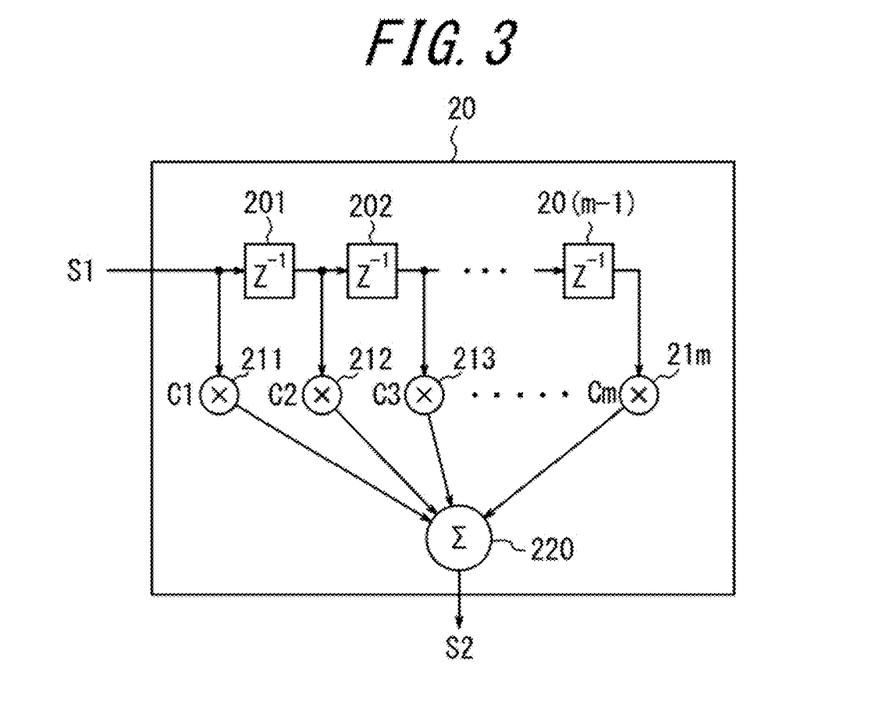
FIG. 3 is a diagram illustrating an example of a configuration a high-pass filter.
Figure 4:
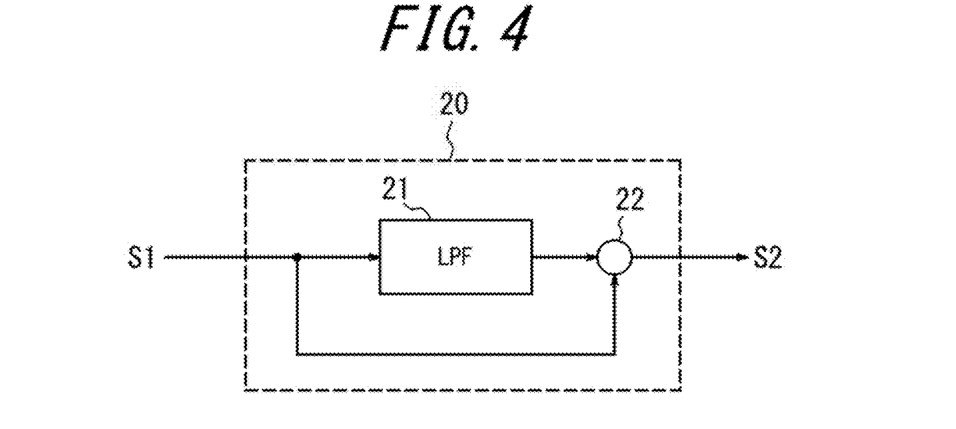
FIG. 4 is a diagram illustrating an example of the high-pass filter constituted by using a low-pass filter.

FIG. 3 is a diagram illustrating an example of a configuration of the HPF 20. As illustrated in FIG. 3, the HPF 20 may be a transversal type digital filter of m taps (m is at least 3) composed of m−1 number of unit delay elements 201 to 20(m−1), m-number of multipliers 211 to 21m, and one adder 220. In this case, each multiplier 21j (j=1 to m, the same applies hereinafter) multiplies a signal being input by a coefficient Cj and outputs a result of the multiplication to the adder 220. The coefficient Cj is set in such a manner that the HPF 20 extracts the high frequency component including the outline component (for example, m=3, C1=0.5, C2=−1, and C3=0.5). Note that, generally, a low-pass filter is substantialized more easily than the high-pass filter. FIG. 4 is a diagram illustrating an example of the high-pass filter using the low-pass filter. As illustrated in FIG. 4, by using the low-pass filter (hereinatter, referred to as an "LPF") 21 and the subtracter 22, the HPF 20 as illustrated in FIG. 1 may be substantialized.

The limiter 30 functions as a regulator of amplitude (a signal level) of the second signal S2 and generates a third signal S3 by adjusting the second signal S2. In particular, the limiter 30 carries out clip processing such that the amplitude of the second signal S2 becomes a predetermined upper limit value or lower and adjusts gain of a level of the second signal by multiplying the second signal S2 by a constant α that satisfies 0≤α<1. Also, the limiter 30, for noise removal, may carry out rounding processing to round a signal value equal to or lower than a predetermined lower limit value of the second signal S2 to 0. The limiter 30 outputs, as the third signal S3, the second signal S2 subjected to the clip processing, the gain adjustment, and the rounding processing to the adder 40.

The adder 40 generates an output image signal $S_{out}$ by adding the third signal S3 as the compensation signal for image sharpening to the input image signal $S_{in}$. That is, $S_{out}=S_{in}+S3$ is satisfied. By adding a third signal S3 as illustrated in FIG. 2(C) to the input image signal as illustrated in FIG. 2(A), the signal subjected to the image enhancement processing as illustrated in FIG. 2(D) is generated. The rising of the edge portion of the output image signal $S_{out}$ is sharper than the edge portion of the input image signal $S_{in}$. That is, an image sharper than the image of the input image signal $S_{in}$ may be obtained. Note that the adder 40 includes, as necessary, a delay element for adjusting the timing between the input image signal $S_{in}$ and the third signal S3.

The image enhancement apparatus 1 according to the present embodiment is capable of compensating a high frequency range exceeding the Nyquist frequency fs/2, which could not have been compensated by the conventional image enhancement apparatus, and thus is effective particularly in improving image quality by sharpening the image represented by the image signal subjected to the enhancement processing. The following is a further detailed description about how the non-linear processing unit 10, by employing the non-linear processing, may compensate the high frequency range exceeding the Nyquist frequency fs/2.

Now, provided that the input image signal $S_{in}$ is expressed by a function f(x) of a (horizontal) position x, and also that the ω represents a fundamental angular frequency of the input image signal $S_{in}$, the f(x) may be expressed by Fourier series such as Formula (4).

[Formula 4]

$$f(x) = a_{-N}\cos(-N)\omega x + a_{-N+1}\cos(-N+1)\omega x + \quad (4)$$
$$\ldots + a_{-j}\cos(-1)\omega x + a_0 + a_1\cos\omega x + a_2\cos 2\omega x + \ldots +$$
$$a_N\cos N\omega x + b_{-N}\sin(-N)\omega x + b_{-N+1}\sin(-N+1)\omega x + \ldots +$$
$$b_{-1}\sin(-1)\omega x + b_1\sin\omega x + b_2\sin 2\omega x + \ldots + b_N\sin N\omega x$$

Here, N is a degree of harmonics of the highest frequency that does not exceed the Nyquist frequency fs/2 corresponding to the sampling frequency fs (before subjected to the image enlargement processing). That is, the following inequality is satisfied:

$$N\omega/(2\pi) \leq fs/2 \leq (N+1)\omega/(2\pi)$$

For example, when the non-linear processing unit 10 generates the first signal S1 by squaring the input image signal $S_{in}$, each term in the first signal S1 is expressed by any one of the following formulae (5a) to (5c).

[Formula 5]

$$a_i \cos i\omega x \times a_j \cos j\omega x \quad (5a)$$

$$a_i \cos i\omega x \times b_j \sin j\omega x \quad (5b)$$

$$b_i \cos i\omega x \times b_j \sin j\omega x \quad (5a)$$

(i=±1, ±2, ..., ±N, j=±1, ±2, ... ±N)

Using a formula for a trigonometric function, the above formulae (5a) to (5c) may be rewritten into formulae (6a) to (6c) shown below.

[Formula 6]

$$\frac{a_i a_j}{2}(\cos(i+j)\omega x + \cos(i-j)\omega x) \quad (6a)$$

$$\frac{a_i b_j}{2}(\cos(i+j)\omega x - \sin(i-j)\omega x) \quad (6b)$$

$$-\frac{b_i b_j}{2}(\sin(i+j)\omega x - \cos(i-j)\omega x) \quad (6c)$$

From the above formula, $(f(x))^2$ includes angular frequency components such as (N+1)ω, (N+2)ω, ..., 2Nω and the like, and thus includes the frequency components higher than the Nyquist frequency fs/2. Therefore, the first signal S1 also includes the frequency component such as a harmonic component such as a frequency 2Nω/(2π) higher than the Nyquist frequency fs/2.

Therefore, when the image signal subjected to the image enlargement processing for doubling the number of pixels in the horizontal direction is input as the input image signal $S_{in}$ to the image enhancement apparatus 1 of the present embodiment, the non-linear processing unit 10 generates the first signal S1 that includes the frequency component higher than the Nyquist frequency fs/2 before subjected to the image enlargement processing. The HPF 20 is designed to generate the second signal S2 by extracting the high frequency component from the first signal S1, and thus the second signal S2 inevitably includes the frequency component higher than the Nyquist frequency fs/2 before subjected to the image enlargement processing. The third signal S3 output by the limiter 30 also includes the frequency component higher than the Nyquist frequency fs/2 before subjected to the image enlargement process. Therefore, the output image signal $S_{out}$ obtained by combining the input image signal $S_{in}$ and the third signal S3 as the compensation signal also includes the frequency component higher than the Nyquist frequency fs/2 before subjected to the image enlargement processing. As a result, the frequency spectrum of the output image signal $S_{out}$, as illustrated in FIG. 11(D), for example, exceeds the original Nyquist frequency fs/2, and frequency components near the new Nyquist frequency Fbs/2 are generated.

In the above description the non-linear processing unit 10 generates the first signal S1 by squaring the input image signal $S_{in}$, and thereby the image enhancement apparatus 1 compensates the high frequency range exceeding the Nyquist frequency fs/2. However, it should be appreciated that the processing carried out by the non-linear processing unit 10 is not limited to the squaring the input image signal $S_{in}$. For example, similarly to the squaring, any powering processing that may generate a frequency component exceeding the Nyquist frequency fs/2 is a matter clearly derived from general trigonometric identities and the like.

Further, any gamma processing (taking the power root) may generate a frequency component exceeding the Nyquist frequency fs/2. The following is a description about, with reference to FIG. 5 and FIGS. 6(A)-6(B), how the non-linear processing unit 10, by employing the gamma processing, may compensate the high frequency range exceeding the Nyquist frequency fs/2.

Figure 5:
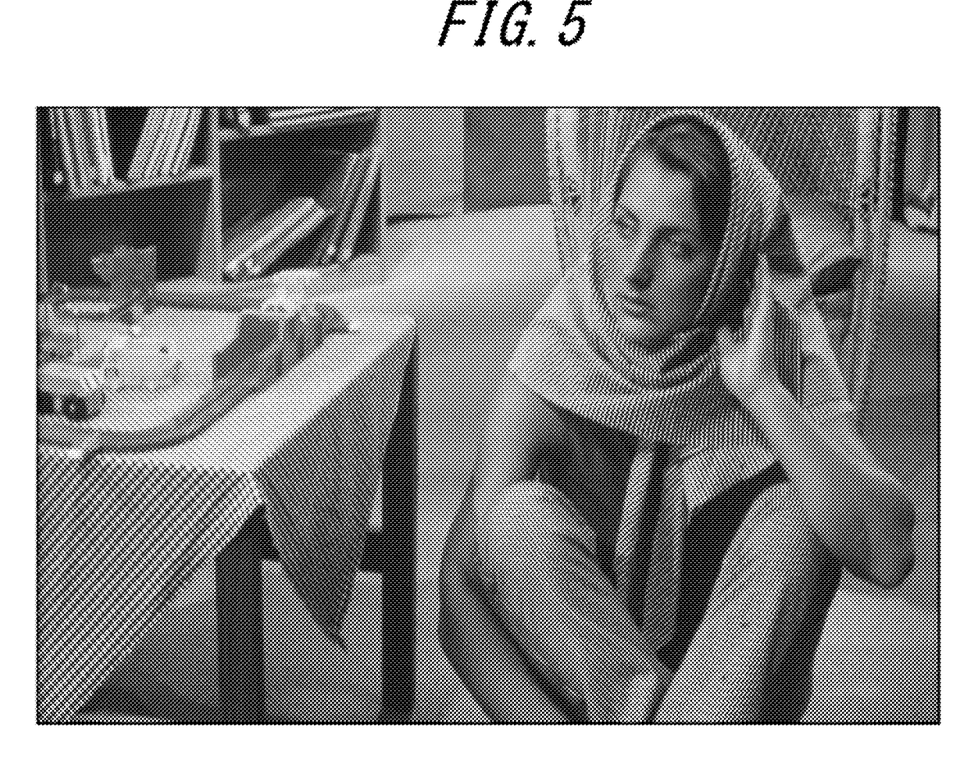
FIG. 5 is an original image used for evaluation of non-linear processing employing gamma processing.
Figure 6:
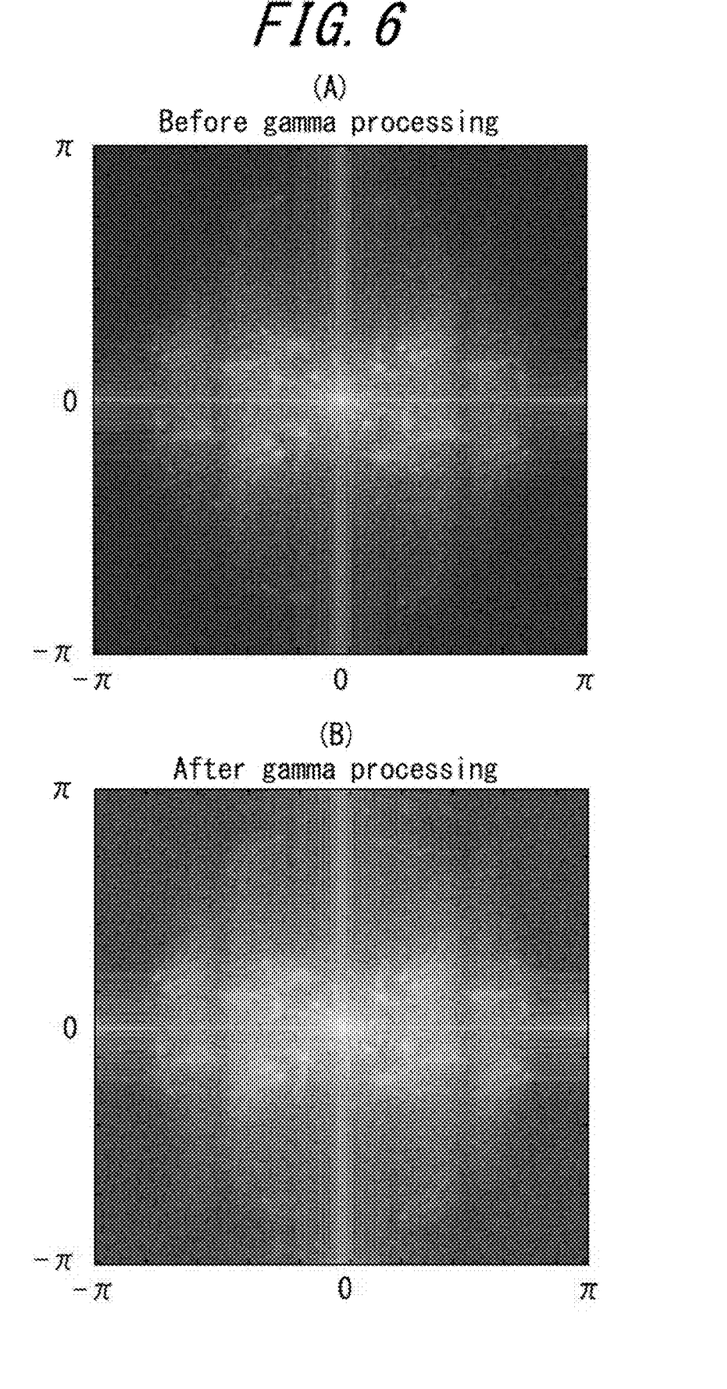
FIGS. 6(A) and 6(B) illustrate frequency spectra before and after the gamma processing.

FIG. 5 is an original image used for an evaluation of the non-linear processing by the gamma processing, and FIGS. 6(A)-6(B) are diagrams illustrating the frequency spectra before and after the gamma processing. FIG. 6(A) illustrates the frequency spectrum of the original image before the gamma processing, and FIG. 6(B) illustrates the frequency spectrum of the original image after the gamma processing. In FIGS. 6(A)-6(B), the non-linear processing unit 10, in gamma processing, obtains the first signal S1 from the square root of the input image signal S.sub.in. That is, S1=S.sub.in.sup.1/2 is satisfied. Comparing between FIG. 6(A) and FIG. 6(B), it can be seen that, in the frequency spectrum of gamma processing illustrated in FIG. 6(B), the range of the frequency components is spread, generating frequency components that are not included in the frequency spectrum of the original image.

The following is a description of a result of application of the image enhancement process according to the present invention on an actual image carried out in order to verify the effects of the present invention.

Figure 7:
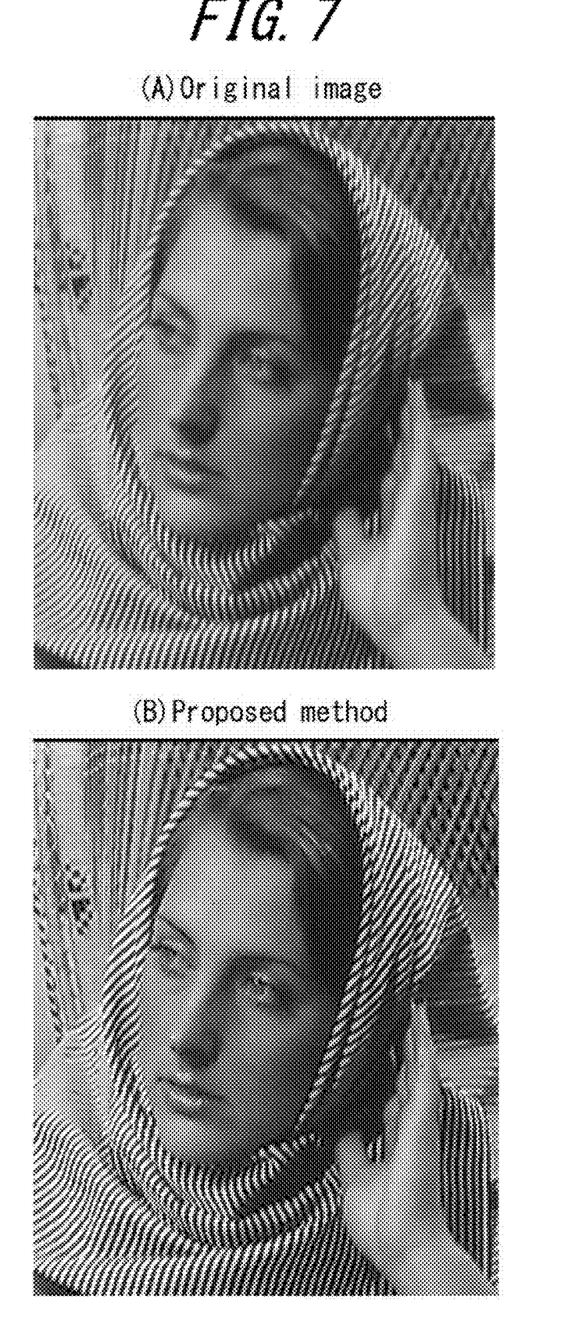
FIGS. 7(A) and 7(B) are diagrams illustrating an image subjected to image enhancement processing according to the present invention.
Figure 8:
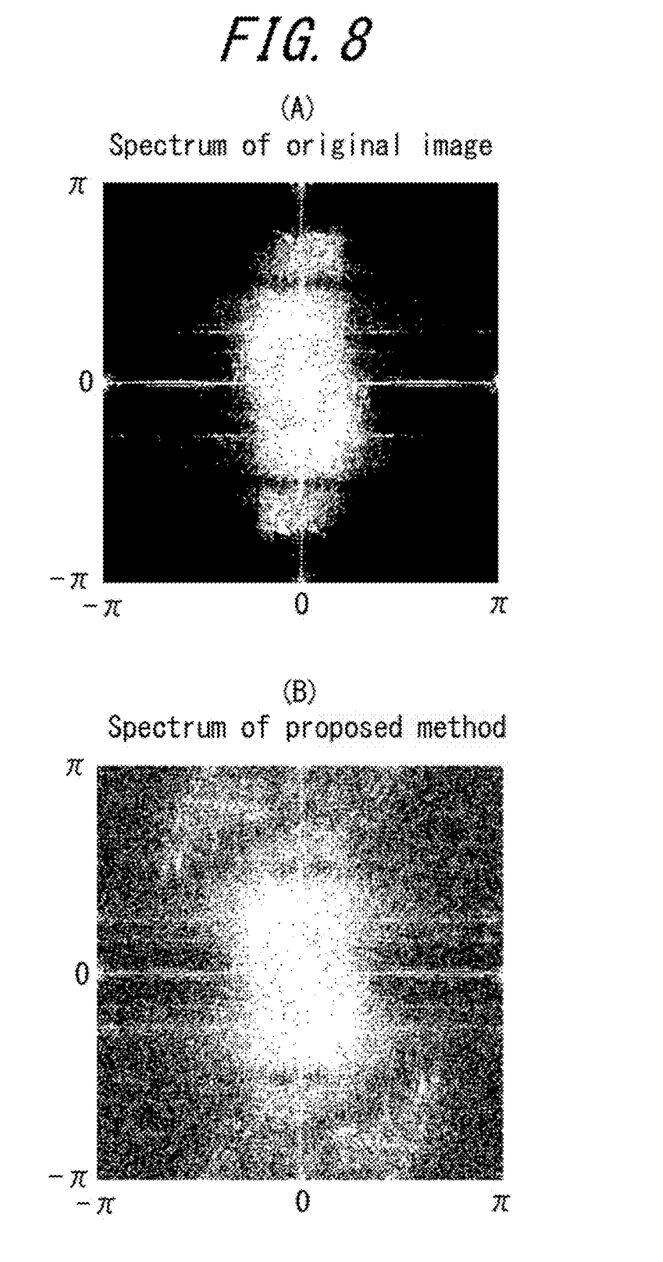
FIGS. 8(A) and 8(B) illustrate a frequency spectrum of the image subjected to the image enhancement processing according to the present invention.

FIGS. 7(A)-7(B) are diagrams illustrating the original image and an image obtained by carrying out the image enhancement processing according to the present invention, and FIG. 8 are diagrams illustrating the frequency spectrum of each of those images. The original image in FIG. 7(A) is obtained by carrying out enlargement processing on the original image to double a width and a height of the original image and does not include frequency components near the Nyquist frequency Fbs/2=fs corresponding to the sampling frequency Fbs=2 fs after the enlargement processing (see FIG. 8(A)).

FIG. 7(B) illustrates an image subjected to the image enhancement processing carried out by the non-liner processing unit 10 once in each of the horizontal direction and the vertical direction by using the first signal S1 obtained from the square root of the input image signal $S_{in}$. Comparing the image in FIG. 7(B) to the image in FIG. 7(A), around the scarf and the back of the chair, the sharpness or the resolution is improved in the image subjected to the method of the present invention and, by the sharpening, the image quality of the entire image is improved. In the frequency spectrum in FIG. 8(B), also, it can be seen that there are generated frequency components exceeding the Nyquist frequency Fbs/2=fs after the enlargement processing, whereby the image is sharpened.

Figure 9:
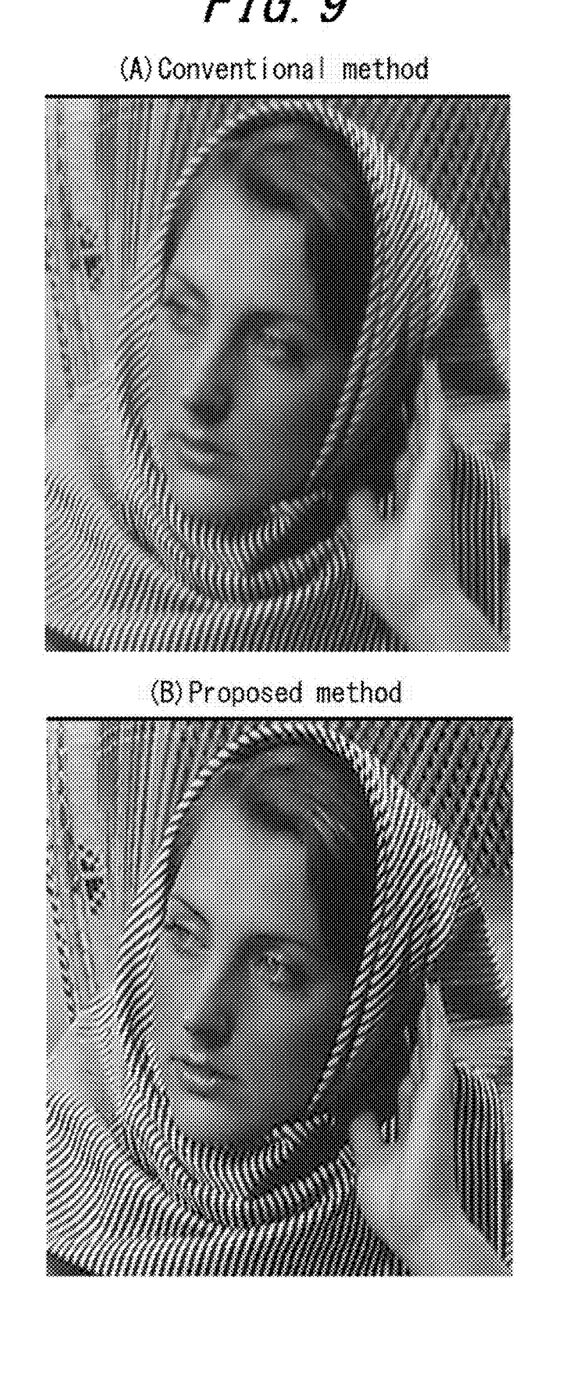
FIGS. 9(A) and 9(B) are diagrams illustrating a comparison between the image subjected to the image enhancement processing according to the present invention and the image subjected to conventional image enhancement processing.

FIGS. 9(A)-9(B) illustrate an image subjected to the image enhancement processing of the present invention and an image subjected to the image enhancement processing employing the conventional linear processing. As described above, the image subjected to the image enhancement processing employing the conventional linear processing cannot generate the frequency components near the Nyquist frequency Fbs/2=fs. Therefore, processing a target image with the conventional image enhancement processing may not improve the image quality of the target image; for example, between the original image in FIG. 7(A) and the image subjected to the conventional image enhancement processing in FIG. 9(A), a difference with respect to the resolution and the sharpness is hardly observed. On the other hand, the image subjected to the image enhancement processing of the present invention illustrated in FIG. 7(B) generates the frequency components exceeding the Nyquist frequency Fbs/2=fs after the enlargement processing and, as can be seen in the figure, is significantly sharpened as compared with the image subjected to the conventional image enhancement processing illustrated in FIG. 9(A).

According to the present embodiment, as described above, the non-linear processing unit 10 generates the first signal S1 by carrying out the non-linear processing on the input image signal $S_{in}$, and the HPF 20 generates the second signal S2 by removing at least the DC component of the frequency components included in the first signal S1. The limiter 30 adjusts the second signal S2 and thereby generates the third signal S3, and the adder 40 adds the third signal S3 to the input image signal $S_{in}$ and thereby generates the output image signal $S_{out}$. Thereby, without repeating arithmetic processing on a plurality of frames, the image may be sharpened by using the frequency components exceeding the Nyquist frequency. Also, the processing allows for unique definition of the output signal with respect to the input signal, preventing a sudden image failure due to failing of image matching, which has been occurred in conventional super-resolution processing techniques.

More specifically, the non-linear processing (for example, Formula (1)) carried out by the non-linear processing unit 10 generates the high frequency components exceeding the Nyquist frequency fs/2 such as the harmonic components of the frequency components of the input image signal $S_{in}$, and, by using the high frequency components, the sharpening processing is carried out on the input image signal $S_{in}$. That is, assuming that, from the digital image signal of the sampling frequency fs, the image enlargement processing generates the image signal of the sampling frequency Fbs=2 fs that is used as the input image signal $S_{in}$, based on the processing carried out by the non-linear processing unit 10, the third signal S3 having the frequency components higher than the Nyquist frequency fs/2 corresponding to the original sampling frequency fs is generated as the compensation signal and added to the input image signal $S_{in}$. Thereby, the frequency spectrum of the output image signal $S_{out}$ of the present embodiment, as illustrated in FIG. 11(D), includes the frequency components exceeding the Nyquist frequency fs/2 before the enlargement processing. Therefore, as compared with the conventional image enhancement apparatus, the image enhancement apparatus of the present invention is capable of sufficiently sharpening the image subjected to the enlargement processing. Note that, although in the above embodiment the image enlargement processing for doubling the size of the image is carried out by way of example, it should be appreciated that the effect of the present invention is not limited thereto.

Also, the non-linear processing unit 10 may generate the first signal S1 from the power of, or the power root of, the input image signal $S_{in}$. That is, the non-linear processing unit 10, by carrying out relatively simple non-linear processing, may generate the high frequency components exceeding the Nyquist frequency fs/2 as the first signal S1.

Also, since the image enhancement apparatus 1 according to the present embodiment may be substantialized with a simple configuration as illustrated in FIG. 1, application of the image enhancement apparatus 1 to a high definition television (HDTV) receiver or a standard definition television (SDTV) receiver allows for an improvement in image quality of a still image as well as a video that is displayed in real time, without imposing a significant increase in cost.

Also, the present embodiment may compensate the high frequency range exceeding the Nyquist frequency fs/2, which could not have been compensated by the conventional image enhancement apparatus, and thus is especially effective in improving the image quality by sharpening an image represented by an image signal subjected to the enhancement processing. For example, when a display of the high definition television (HDTV) receiver displays an image by carrying out the enlargement processing on an image signal of the standard definition television (SDTV), the present embodiment is very effective as being capable of sufficiently sharpening the video displayed in real time with a simple configuration. Also, a display with the number of pixels approximately 4000×2000 (hereinafter, referred to as a "4 k display"), which is greater than the number of pixels of the HDTV, and techniques for television broadcast conforming to the 4 k display have been currently developed, and when the image signal for the HDTV is up-converted to be displayed on the 4 k display, the present embodiment is very effective in a similar manner.

Further, as an image processing technique utilizing human perceptual characteristics, for example, there has been known HDR (high dynamic range) synthesis. The HDR converts an original image (reality) with a very large contrast into an image with a reduced contrast. The HDR uses the gamma correction function for tone mapping to reduce the contrast and thereby increases the brightness of pixels in the region with low brightness. The image enhancement apparatus 1 according to the present embodiment carries out the non-linear processing (gamma processing) based on the human perceptual characteristics in a similar manner as the HDR synthesis and, by sharpening an outline in the region with low brightness, may sharpen the image in a more preferred manner for human and improve the image quality.

INDUSTRIAL APPLICABILITY

The present invention is intended to be applied to the image enhancement apparatus for improving image quality by sharpening an image, and applicable to, for example, the image enhancement apparatus for sharpening the video that is displayed in real time on a television (TV) receiver.

The present invention is applicable also to image enhancement processing of a monitoring camera and, for example, capable of reducing blur in an enlarged portion of an image. Also, the present invention allows for the image enhancement processing for sharpening an outline in a region with low brightness in an image captured by the monitoring camera installed in a dark position, or in an image taken at night.

The present invention is applicable also to resolution enhancement of an image captured from a distance. For example, an image of an accident site difficult to access taken from a distance and a satellite image may be processed with the image enhancement processing for sharpening the outline.

The present invention is applicable also to high-definition conversion of analog contents. That is, in order to convert existing analog contents into high-definition contents, the image enhancement processing for sharpening the outline of the up-converted image is carried out. Thereby, the analog contents may be reproduced as digital contents with higher definition. The present invention is applicable to, for example, conversion of the analog television contents into high-resolution contents, and conversion of contents of an old movie into digital contents with higher definition (for example, Blu-ray (registered trademark) contents).

The present invention is applicable also to a medical field. For example, the present invention allows for conversion of an enlarged image of an affected site taken by an endoscope or the like into an image with higher definition image, or conversion of an image of an affected site with low resolution into an image with higher definition in the remote medical care.

Further, the present invention is applicable also to higher-definition conversion of video contents that can be viewed on a computer. On the internet, there are a number of websites for distributing video contents, and numerous video contents have already been stored. The present invention allows for conversion of the existing video contents into contents with higher definition and higher resolution, thereby improving viewing quality.

Although the present invention has been described based on the figures and the embodiment, it is to be understood that various modifications and changes may be implemented based on the present disclosure by those who are ordinarily skilled in the art. Accordingly, such modifications and changes are included in a scope of the present invention. For example, functions and the like included in each unit or each step may be rearranged without logical inconsistency, so as to combine a plurality of units or steps together or to divide them.

REFERENCE SIGNS LIST 1 image enhancement apparatus
10 non-linear processing unit
20 HPF (high-pass filter)
201-20($m$−1) unit delay element
211-21$m$ multiplier
220 adder
21 LPF (low-pass filter)
22 subtracter
30 limiter
40 adder

The invention claimed is:

1. An image enhancement apparatus for generating an output image obtained by sharpening an input image, comprising:
   a non-linear processing unit, implemented by a processor, configured to generate a first signal by carrying out non-linear processing on an input image signal representing the input image, the first signal being expressed as a continuous non-linear function with respect to the input image signal;
   a filter configured to extract a second signal based on the generated first signal by filtering out or removing at least a direct current (DC) component of frequency components included in the generated first signal;

a limiter configured to generate a third signal by carrying out clip processing or linear processing on the extracted second signal; and an adder configured to generate an output image signal representing an output image by adding the third signal to the input image signal.

2. The image enhancement apparatus according to claim 1, wherein the non-linear processing unit generates the first signal based on a power of the input image signal.

3. The image enhancement apparatus according to claim 1, wherein the non-linear processing unit generates the first signal based on a power root of the input image signal.

4. An image enhancement method employed by an image enhancement apparatus for generating an output image obtained by sharpening an input image, the image enhancement method comprising:

generating a first signal by carrying out non-linear processing on an input image signal representing the input image, the first signal being expressed as a continuous non-linear function with respect to the input image signal;

extracting a second signal based on the generated first signal by filtering out or removing at least a direct current (DC) component of frequency components included in the generated first signal;

generating a third signal by carrying out clip processing or linear processing on the extracted second signal; and generating an output image signal representing an output image by adding the third signal to the input image signal.

5. The image enhancement method according to claim 4, wherein the first signal generation includes generating the first signal based on a power of the input image signal.

6. The image enhancement method according to claim 4, wherein the first signal generation includes generating the first signal based on a power root of the input image signal.

* * * * *